United States Patent Office 2,830,102
Patented Apr. 8, 1958

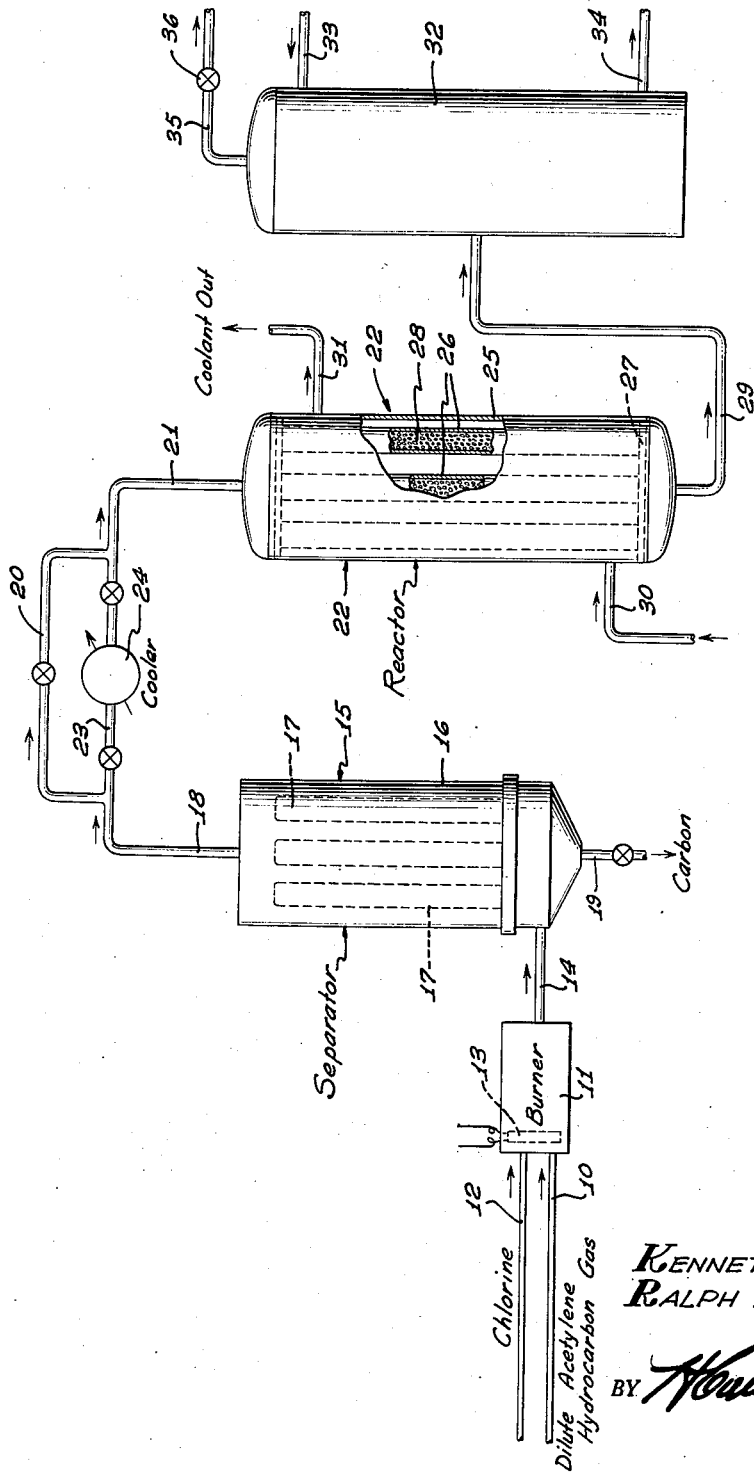

2,830,102

PRODUCTION OF VINYL CHLORIDE FROM CRACKED HYDROCARBON GASES CONTAINING ACETYLENE

Kenneth A. Kobe, Austin, Tex., and Ralph E. Lynn, Jr., Cuyahoga Falls, Ohio

Application January 18, 1954, Serial No. 404,715

14 Claims. (Cl. 260—656)

This invention has to do generally with the production of vinyl chloride, and is directed particularly to a novel process for vinyl chloride formation in situ within hydrocarbon gas mixtures containing hydrogen and ordinarily low concentrations of acetylene.

The increasing importance of monomeric vinyl chloride arises because of its utility as a synthesis compound from which various products of expanding applicability, and notably the polyvinyl resins, can be made. One of the established methods for making vinyl chloride is by the reaction of acetylene with hydrogen chloride, using catalyst such as the metallic halides, e. g. halides of mercury, copper and barium, and of which mercuric chloride appears to have had preference. Ordinarily the acetylene used will have been obtained in a relatively pure condition, as by separation from a gas mixture or as derived from acetylene synthesis conducted especially for reaction of the acetylene and hydrogen chloride to vinyl chloride.

From various sources may be obtained hydrogen-containing gases having concentrations of acetylene so low as to render relatively uneconomical or competitively too expensive a separation of the acetylene for vinyl chloride production. Particular sources for such gases, and which lend themselves advantageously and economically to the present process, are the highly cracked hydrocarbon gases produced by the known Schoch process (see "Acetylene from Hydrocarbons," University of Texas Publication No. 5011, Austin, Texas, June 1950); the Wulff process (see "Industrial and Engineering Chemistry," vol. 45, No. 12, pp. 2596–2606; December 1953), and the Sachse process (see U. S. Dept. Commerce, FIAT report No. 988, P. B. 67790; 1947).

The following table gives typical gas compositions as obtained from these processes:

| Component | Schoch Process, Nat. Gas, mole percent | Wulff Process | | Sachse Process, Nat. Gas, mole percent |
| --- | --- | --- | --- | --- |
| | | Nat. Gas, mole percent | Propane, mole percent | |
| Acetylene | 11.5 | 6.8 | 13.9 | 7.7 |
| Hydrogen | 38.0 | 45.4 | 50.2 | 54.3 |
| Methane | 42.5 | 34.5 | 16.5 | 5.3 |
| Heavier Hydrocarbons | 7.3 | 2.0 | 7.6 | 0.5 |
| Carbon dioxide | 0.2 | 1.4 | 1.7 | 3.0 |
| Carbon monoxide | 0.3 | 6.7 | 8.2 | 26.5 |
| Nitrogen | | 3.2 | 1.9 | 2.3 |
| Oxygen | 0.2 | | | 0.4 |
| | 100.0 | 100.0 | 100.0 | 100.0 |

This invention has for one of its primary objects the conversion of substantially the entire acetylene content of such gases to vinyl chloride in a manner obviating any necessity for pre-separation of the acetylene, and by formation of the vinyl chloride directly in the gaseous mixture. Specifically contemplated is a novel process distinguishing the invention from all prior practices of which we are aware, whereby the hydrogen and acetylene contents of the same gas stream are used in conjunction with chlorine addition to the gas, to form sequentially hydrogen chloride and vinyl chloride, all in situ within the gas stream and by a continuous process.

In further reference to the gas composition, the invention is practicably applicable to vinyl chloride formation in gases considered to be very dilute as to acetylene, e. g. containing as low as around 3 mole percent. The utility of the process of course applies also to gases of higher acetylene content, e. g. where the acetylene content might be as high as 20 mole percent. However, the invention is primarily directed to use of those gases containing acetylene in such dilute concentrations as require the aforesaid in situ formation of hydrogen chloride for practicably economical use of the acetylene for vinyl chloride production. The hydrogen content of the gas may vary, as for example between 30–60 mole percent, and is not of primary importance so long as there is present in the gas being reacted with the chlorine, sufficient hydrogen to produce the amount of hydrogen chloride required for reaction with all the acetylene.

The present process involves the first step of introducing chlorine into the gaseous mixture and reacting the chlorine with hydrogen in the gas to convert preferably all the chlorine to hydrogen chloride. This reaction being highly exothermic, the temperature increase may be sufficient to crack some of the hydrocarbons in the gas mixture in a manner productive of appreciable quantities of acetylene over the initial acetylene content of the gas. The reaction also will ordinarily result in some formation of carbon, and relatively heavy unsaturated hydrocarbons which may be separated to avoid contamination in the subsequent stage.

The gaseous mixture with its hydrogen chloride content is then contacted with a suitable catalyst, preferably under controlled temperature conditions, which promotes the acetylene-hydrogen chloride reaction to the point of substantially complete conversion to the vinyl chloride monomer of the entire acetylene content of the gas. It will be understood that the invention contemplates the use of any suitable catalyst for effecting the hydrogen chloride reaction, for example, the metallic (notably mercury) halides, particularly mercuric chloride, and mixtures thereof with other metal catalysts which the patent and other literature shows to be well known for catalyzing this reaction.

The converted gas mixture may be given any suitable final treatment, as by absorption and fractionation, for separation of the vinyl chloride. Those familiar with the art will recognize the applicability of conventional methods and apparatus for this purpose.

The invention and further details concerning its operation will be understood more fully from the following description of the accompanying drawing which shows an illustrative embodiment in a process operating sequentially to convert the hydrogen content of a dilute acetylene-containing hydrocarbon gas to hydrogen chloride, and then effect in the presence of a catalyst, the acetylene-hydrogen chloride reaction to form vinyl chloride.

Referring to the drawing, a dilute acetylene-containing hydrocarbon gas of the composition order referred to in the foregoing, preliminarily may be scrubbed free of solid materials and introduced through line 10 to a reaction chamber or burner 11 which is fed through line 12 with chlorine gas in an amount sufficient for reaction with the hydrogen content of the hydrocarbon gas stream, to produce hydrogen chloride in quantities sufficient for conversion of the acetylene content of the hydrocarbon gas. In starting the operation, an independent heating means, typically an electrical heating element 13, may function in the burner chamber to initiate the hydrogen and chlorine reaction, following which the reaction is self-continuing because of its highly exothermic nature, giving e. g. a burner chamber outlet temperature between 350° F. to 700° F. The temperatures in the flame itself may be sufficiently high, for example in excess of 1500° F., to produce further cracking of the hydrocarbons and the production of appreciable quantities of acetylene in addition to that contained in the burner fed stream.

Leaving the burner through line 14 the hydrogen chloride-containing hydrocarbon gas stream may be given any suitable treatment in advance of the catalyst reactor, for the removal of carbon and other impurities produced by the high temperature reaction in the burner, and also if desired for cooling the gas stream to within a temperature range most desirable for efficient conversion in the reactor. Merely as illustrative, the gas stream is shown to be discharged from the burner through a carbon separator generally indicated at 15, which may comprise a shell 16 containing a plurality of bag or other type filters 17 through which the gas passes to the outlet line 18, and within which the carbon is retained for settling out into the base of the shell and removal through line 19. The gas leaving the separator may be passed through lines 20 and 21 to the catalyst reactor generally indicated at 22, or where it is desired to cool the gas, some or all of the gas may be passed through line 23 and cooler 24. When using in the reactor mercuric chloride catalyst of the type commonly used for acetylene conversion by reaction of hydrogen chloride to produce vinyl chloride, the gas stream may be cooled so that it enters the reactor within a range of about 200° F. to 400° F.

The reactor 22 may be of any suitable design permitting intimacy of contact of the catalyst contained within the reactor shell 25 by the gas stream introduced from line 21. Merely as illustrative, the reactor shell is shown to contain a plurality of tubes 26 terminating in sheets 27 and filled with the catalyst 28 so that the gas stream flows downwardly through the catalyst columns to the outlet line 29. The acetylene-hydrogen chloride reaction catalyzed in the reactor being exothermic, ordinarily it will be desired to control or limit the temperatures in the catalyst as by passing a cooling fluid from the inlet 30 to the outlet 31 through the reactor in contact with the tubes 26. Generally speaking, the temperature of the gas stream in the reactor may be confined within the range of about 200° F. to 400° F.

The resulting gas stream may be subjected to any suitable further treatment for separation of its vinyl chloride content. This may be done for example using conventional absorption and fractionating methods and equipment. For present purposes it will suffice to indicate that the gas stream in line 29 may be introduced to an absorber 32 and therein contacted with a solvent for vinyl chloride introduced through line 33 and acting to remove from the gas its vinyl chloride, the rich absorbent being removed through line 34. The residual gases are removed through line 35 for further treatment. Vinyl chloride is recovered from the rich solution by the use of heat and/or reduced pressure and the clean solvent is recycled to line 33.

The described process may be operated under ordinary pressures, controllable for example by the valve 36 which may range for example between 1 to 30 atmospheres absolute.

In operation of the process we have used catalyst in the form of a complex chloride supported on activated carbon prepared according to the following formulation:

3000 grams (6.5 liters) activated carbon
500 grams mercuric chloride
500 grams barium chloride
200 ml. methanol
1800 ml. water The barium chloride and mercuric chloride were dissolved in the water-methanol solution. The presence of the barium chloride greatly increased the solubility of the mercuric chloride. If mercuric chloride was present alone, solution could be achieved only by heating to the boiling point. This phenomenon confirmed the belief that a complex of mercuric-barium-chloride was formed. The methanol was used in the formulation to obtain a deeper penetration of the complex into the pores of the activated carbon.

The solution of the complex salt was poured, with agitation, over the activated carbon. There was just enough of the solution to thoroughly wet the carbon. The mixture was then dried over a steam-bath for two hours and finally in an oven at 105° C. for 24 hours.

The following tabulation shows the results obtained in a series of typical runs employing oil-washed Schoch feed gas, with the reactor temperature maintained at about 180° C.

| Mixture, S. C. F. M. | $C_2H_2$, percent | $C_2H_2$, S.C.F.M. | $Cl_2$, S.C.F.M. | Total, S.C.F.M. | Excess HCl, percent | $C_2H_2$ in Exit Gas, percent | Conversion, percent | Yield [1] | Space Velocity in Catalyst |
|---|---|---|---|---|---|---|---|---|---|
| 1.050 | 11.1 | 0.117 | 0.076 | 1.126 | 30 | 0.14 | 98.9 | 85 | 294 |
| 1.175 | 11.1 | 0.131 | 0.085 | 1.260 | 30 | 0.24 | 98.2 | 94 | 329 |
| 1.050 | 10.6 | 0.111 | 0.070 | 1.120 | 26 | 0.15 | 98.8 | 80 | 292 |
| 1.175 | 10.9 | 0.128 | 0.078 | 1.253 | 22 | 0.30 | 97.6 | 91 | 327 |
| 1.310 | 10.9 | 0.143 | 0.086 | 1.396 | 20 | 0.51 | 96.0 | 100 | 364 |
| 1.454 | 10.9 | 0.159 | 0.096 | 1.550 | 21 | 0.79 | 93.8 | 109 | 404 |
| 1.596 | 10.9 | 0.174 | 0.106 | 1.702 | 22 | 1.01 | 92.0 | 117 | 444 |
| 1.670 | 11.0 | 0.184 | 0.111 | 1.781 | 20 | 1.31 | 89.8 | 121 | 465 |

[1] Yield is grams vinyl chloride produced per liter catalyst per hour.

Product gases from both the regenerative furnace (Wulff) and partial oxidation (Sachse) processes of manufacturing acetylene contain appreciable concentration of carbon monoxide. The applicability of the proposed process to such carbon monoxide containing gases was established by operating the process with a feed gas produced by washing Schoch electric discharge process gas with oil to remove higher acetylene and adding approximately 30 mole percent carbon monoxide. It was found that the carbon monoxide did not appreciably affect the operation of the process as shown by the following typical examples of tests conducted at 150° C.:

| Mixture, S. C. F. M. | $C_2H_2$, S.C.F.M. | CO, S.C.F.M. | $Cl_2$, S.C.F.M. | Total, S.C.F.M. | $C_2H_2$ in Exit Gas, percent | Conversion, percent | Yield [1] | Space Velocity | $C_2H_2$ Space Velocity |
|---|---|---|---|---|---|---|---|---|---|
| 0.540 | 0.0523 | 0.162 | 0.035 | 0.737 | 0.09 | 99.0 | 38 | 192 | 13.6 |
| 1.050 | 0.111 | 0.315 | 0.070 | 1.44 | 0.81 | 91.3 | 74 | 375 | 29.0 |

[1] Yield—grams vinyl chloride per liter catalyst per hour.

We claim:

1. The method of producing vinyl chloride from a cracked hydrocarbon gas stream containing hydrogen and a relatively low quantity of acetylene, that comprises adding chlorine to said stream and reacting the chlorine with hydrogen in the gas to produce hydrogen chloride in a hot gas stream heated by the exothermic chlorine-hydrogen reaction, contacting the resulting gas mixture with a catalyst and thereby reacting the hydrogen chloride with the acetylene content of the gas to produce vinyl chloride, and separating the vinyl chloride from the residual gas mixture.

2. The method of producing vinyl chloride from a cracked hydrocarbon gas stream containing hydrogen and a relatively low quantity of acetylene, that comprises adding chlorine to said stream and reacting the chlorine with hydrogen in the gas to produce hydrogen chloride and carbon in a hot gas stream heated by the exothermic chlorine-hydrogen reaction, separating the carbon from the gas, contacting the resulting gas mixture with a catalyst and thereby reacting the hydrogen chloride with the acetylene content of the gas to produce vinyl chloride, and separating the vinyl chloride from the residual gas mixture.

3. The method of producing vinyl chloride from a cracked hydrocarbon gas stream containing hydrogen and a relatively low quantity of acetylene, that comprises adding chlorine to said stream and reacting the chlorine with hydrogen in the gas to produce hydrogen chloride in a hot gas stream heated by the exothermic chlorine-hydrogen reaction, cooling the gas, contacting the resulting gas mixture with a catalyst and thereby reacting the hydrogen chloride with the acetylene content of the gas to produce vinyl chloride, and separating the vinyl chloride from the residual gas mixture.

4. The method of producing vinyl chloride from a cracked hydrocarbon gas stream containing hydrogen and a relatively low quantity of acetylene, that comprises adding chlorine to said stream and reacting the chlorine with hydrogen in the gas in a zone to produce hydrogen chloride in a hot gas stream heated by the exothermic chlorine-hydrogen reaction, withdrawing the gas from said zone at a temperature between about 350° F. to 700° F., contacting the resulting gas mixture with a catalyst and thereby reacting the hydrogen chloride with the acetylene content of the gas to produce vinyl chloride, and separating the vinyl chloride from the residual gas mixture.

5. The method of producing vinyl chloride from a cracked hydrocarbon gas stream containing hydrogen and a relatively low quantity of acetylene, that comprises adding chlorine to said stream and reacting the chlorine with hydrogen in the gas to produce hydrogen chloride in a hot gas stream heated by the exothermic chlorine-hydrogen reaction, contacting the resulting gas mixture with a catalyst at a temperature between about 200° F. to 400° F. and thereby reacting the hydrogen chloride with the acetylene content of the gas to produce vinyl chloride, and separating the vinyl chloride from the residual gas mixture.

6. The method of producing vinyl chloride from a cracked hydrocarbon gas stream containing hydrogen and a relatively low quantity of acetylene, that comprises adding chlorine to said stream and reacting the chlorine with hydrogen in the gas in a zone to produce hydrogen chloride in a hot gas stream heated by the exothermic chlorine-hydrogen reaction, withdrawing the gas from said zone at a temperature between about 350° F. to 700° F., contacting the resulting gas mixture with a catalyst at a temperature between about 200° F. to 400° F. and thereby reacting the hydrogen chloride with the acetylene content of the gas to produce vinyl chloride, and separating the vinyl chloride from the residual gas mixture.

7. The method of producing vinyl chloride from a cracked hydrocarbon gas stream containing hydrogen and a relatively low quantity of acetylene, that comprises adding chlorine to said stream and reacting the chlorine with hydrogen in the gas to produce hydrogen chloride in a hot gas stream heated by the exothermic chlorine-hydrogen reaction, contacting the resulting gas mixture with a catalyst and thereby reacting the hydrogen chloride with the acetylene content of the gas to produce vinyl chloride, separating the vinyl chloride from the residual gas mixture, and conducting said reactions under pressure between about 1 to 30 atmospheres absolute.

8. The method of producing vinyl chloride from a cracked hydrocarbon gas stream containing hydrogen and a relatively low quantity of acetylene, that comprises adding chlorine to said stream and reacting the chlorine with hydrogen in the gas in a zone to produce hydrogen chloride in a hot gas stream heated by the exothermic chlorine-hydrogen reaction, withdrawing the gas from said zone at a temperature between about 350° F. to 700° F., contacting the resulting gas mixture with a catalyst at a temperature between about 200° F. to 400° F. and thereby reacting the hydrogen chloride with the acetylene content of the gas to produce vinyl chloride, separating the vinyl chloride from the residual gas mixture, and conducting said reactions under pressure between about 1 to 30 atmospheres absolute.

9. The method as defined in claim 1, in which the catalyst contains a mercury halide.

10. The method as defined in claim 7, in which the catalyst contains mercuric chloride.

11. The method of producing vinyl chloride from a cracked hydrocarbon gas stream containing hydrogen and a relatively low quantity of acetylene, that comprises adding chlorine to said stream and reacting the chlorine with hydrogen in the gas under temperature and pressure conditions causing formation of hydrogen chloride and also conversion of hydrocarbons in the gas to acetylene in a hot gas stream heated by the exothermic chlorine-hydrogen reaction, contacting the resulting gas mixture with a catalyst and thereby reacting the hydrogen chloride with the acetylene content of the gas to produce vinyl chloride, and separating the vinyl chloride from the residual gas mixture.

12. The method of producing vinyl chloride from a cracked hydrocarbon gas stream containing hydrogen and a relatively low quantity of acetylene, that comprises adding chlorine to said stream and reacting the chlorine with hydrogen in the gas under temperature and pressure conditions causing formation of hydrogen chloride and also conversion of hydrocarbons in the gas to acetylene in a hot gas stream heated by the exothermic chlorine-hydrogen reaction, contacting the resulting gas mixture with a catalyst and thereby reacting the hydrogen chloride with the acetylene content of the gas to produce vinyl chloride, separating the vinyl chloride from the residual gas mixture, and conducting said reactions under pressure between about 1 to 30 atmospheres absolute.

13. The method of producing vinyl chloride from a cracked hydrocarbon gas stream containing hydrogen and a relatively low quantity of acetylene, that comprises adding chlorine to said stream and reacting the chlorine with hydrogen in the gas to produce hydrogen chloride in a hot gas stream heated by the exothermic chlorine-hydrogen reaction, then separating carbonaceous residue from the gas, contacting the resulting gas mixture with a catalyst and thereby reacting the hydrogen chloride with the acetylene content of the gas to produce vinyl chloride, and separating the vinyl chloride from the residual gas mixture.

14. The method of producing vinyl chloride from a cracked hydrocarbon gas stream containing hydrogen and a relatively low quantity of acetylene, that comprises adding chlorine to said stream and reacting the chlorine with hydrogen in the gas in a zone to produce hydrogen chloride in a hot gas stream heated by the exothermic chlorine-hydrogen reaction, withdrawing the gas from said zone at a temperature between about 350° F. to 700° F., then separating carbonaceous residue from the gas, contacting the resulting gas mixture with a catalyst at a temperature between about 200° F. to 400° F. and thereby reacting the hydrogen chloride with the acetylene content of the gas to produce vinyl chloride, and separating the vinyl chloride from the residual gas mixture.

References Cited in the file of this patent

UNITED STATES PATENTS

| | | |
|---|---|---|
| 2,328,430 | Dornte | Aug. 31, 1943 |
| 2,705,732 | Braconier et al. | Apr. 5, 1955 |

FOREIGN PATENTS

| | | |
|---|---|---|
| 780,057 | France | Apr. 18, 1935 |